United States Patent [19]
Ghaem et al.

[11] Patent Number: 5,697,681
[45] Date of Patent: Dec. 16, 1997

[54] ANTI-LOCK BRAKING SYSTEM AND METHOD USING A POLYNOMIAL PROCESSOR

[75] Inventors: Sanjar Ghaem, Palatine; Shay-Ping T. Wang, Long Grove, both of Ill.; Scott E. Lloyd, Mesa, Ariz.

[73] Assignee: Motorola, Inc., Schaumburg, Ill.

[21] Appl. No.: 549,619

[22] Filed: Oct. 27, 1995

[51] Int. Cl.$^6$ ................................................ B60T 8/32
[52] U.S. Cl. ........................... 303/168; 303/150; 303/165
[58] Field of Search .................................. 303/158, 160, 303/174, 150, 175, 183

[56] References Cited

U.S. PATENT DOCUMENTS

| | | | |
|---|---|---|---|
| 4,491,920 | 1/1985 | Wood et al. | 303/123 |
| 4,715,662 | 12/1987 | van Zanten et al. | 303/150 |
| 5,001,640 | 3/1991 | Matsumoto et al. | 303/165 |
| 5,416,709 | 5/1995 | Yeh et al. | 303/168 |
| 5,513,907 | 5/1996 | Kiencke et al. | 303/166 |

*Primary Examiner*—Matthew C. Graham
*Attorney, Agent, or Firm*—Jeffrey G. Toler; Bruce E. Stuckman

[57] ABSTRACT

An anti-lock braking system for a vehicle having a plurality of wheels, and a braking system that includes a brake for braking at least one of the plurality of wheels and a brake valve for controlling a braking pressure in the brake in response to a brake valve signal, includes a plurality of wheel speed sensors for generating a plurality of input signals. A polynomial processor, in communication with the plurality of wheel speed sensors, generates a control signal based on a nonlinear polynomial function of the input signal. A post-processor generates the Brake valve signal based on the control signal so as to provide cyclic control of the braking pressure in the brake.

26 Claims, 3 Drawing Sheets

ANTI-LOCK BRAKING SYSTEM AND METHOD USING A POLYNOMIAL PROCESSOR

RELATED INVENTIONS

The present invention is related to the following inventions which are assigned to the same assignee as the present invention:

(1) "Neural Network and Method of Using Same", having Ser. No. 08/076,601, filed Jun. 14, 1993, now U.S. Pat. No. 5,517,667;

(2) "Auto Tuning Controller and Method of Use Therefor" having Ser. No. 08/268,395, filed Jun. 30, 1994, now U.S. Pat. No. 5,849,062;

(3) "Auto-Scaling Controller and Method of Use Therefor" having Ser. No. 08/282,118, filed Jul. 28, 1994, now U.S. Pat. No. 5,633,988;

(4) "Cascade Tuning Controller and Method of Use Therefor" having Ser. No. 08/288,379, filed Aug. 10, 1994.

(5) "Controller for Nonlinear Systems and Method for Use Thereof" having Ser. No. 08/358,291, filed Dec. 19, 1994, now U.S. Pat. No. 5,550,732;

(6) "Method of Programming a Polynomial Processor", having Ser. No. 08/358,278, filed Dec. 19, 1994.

(7) "Polynomial controller for nonlinear systems and methods of use thereof," having Ser. No. 08/358,426, filed Dec. 19, 1994, now U.S. Pat. No. 5,546,302.

(8) "Traction control system and method for use therewith," Ser. No. 08/549,618 filed Oct. 27, 1995.

The subject matter of the above-identified related inventions is hereby incorporated by reference hereto into the disclosure of this invention.

FIELD OF THE INVENTION

The present invention relates generally antilock braking systems and, in particular, to controllers for use therein.

BACKGROUND OF THE INVENTION

Antilock braking systems are commonly used in wheeled vehicles to control the braking action of these vehicles. Antilock braking systems attempt to control the brake pressure to prevent a wheel lock-up condition that can lead to a loss of vehicle control.

While existing systems are, in many ways, quite adequate. The accuracy of these systems in detecting potential lock-up conditions and their speed of response to these conditions is a function of the overall sophistication of the control mechanisms that are used in these systems. A need exists for faster and more accurate control mechanisms to allow for even safer and more reliable operation.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
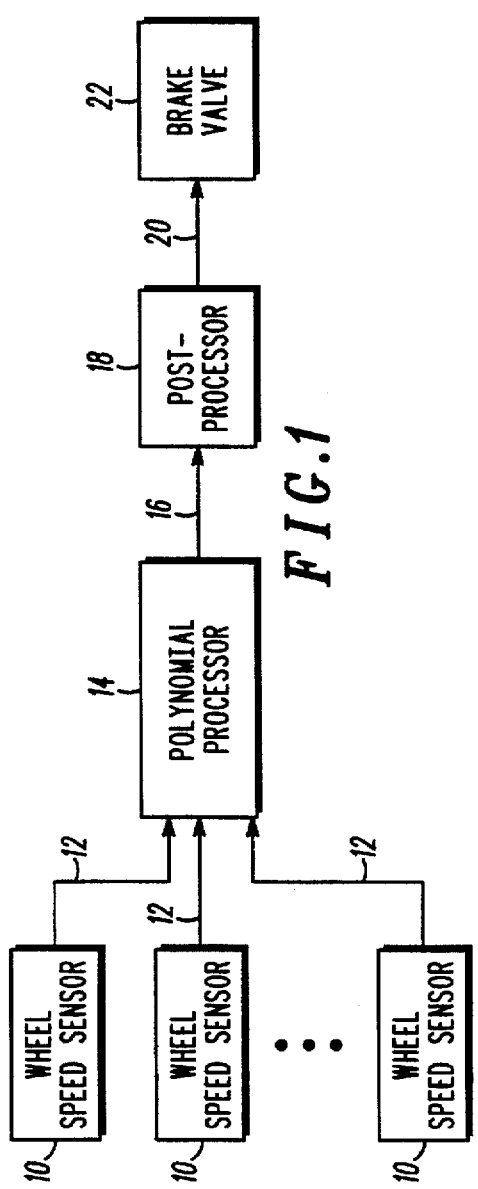
FIG. 1 illustrates a block diagram representation of an antilock braking system in accordance with an embodiment of the present invention.

FIG. 1 illustrates a block diagram representation of an antilock braking system in accordance with an embodiment of the present invention. In particular, an anti-lock braking system for a vehicle is presented, the vehicle having a plurality of wheels, and a braking system that includes a brake for braking at least one of the plurality of wheels and a brake valve 22 for controlling a braking pressure in the brake in response to a brake valve signal 20.

Wheel speed sensors 10 are coupled to one or more wheels of a vehicle. Each wheel speed sensor provides a corresponding input signal 12 that is proportional to wheel speed of the corresponding wheel of the vehicle. Several configurations are commonly in use in the art. In one embodiment, a four-wheeled vehicle has four wheel speed sensors, one sensors for each wheel. In other embodiments, three wheel speed sensors are used for a four-wheeled vehicle. In this case, the front wheels are each equipped with a wheel speed sensor and the average speed of the rear wheels is determined collectively by a single sensor that is coupled to the rear differential of the vehicle. Other configurations are similarly possible.

In one embodiment of the present invention wheel speed sensors 10 includes a multi-toothed wheel and pick-up that generates a series of pulses whose frequency is proportional to the speed of the wheel. The wheel speed sensors 10 further includes a frequency to voltage converter for converting the pulsed signal to a d.c. value in proportion to the velocity of the wheel. Other wheel speed sensors can also be used as will be apparent to one of ordinary skill in the art.

A polynomial processor 14 is in communication with the plurality of wheel speed sensors 10 and is response to the plurality of input signals 12. Polynomial processor 14 generates a control signal 16 based on a nonlinear polynomial function of the plurality of input signals 12. Post-processor 18 generates the brake valve signal 20 based on the control signal so as to provide cyclic control of the braking pressure in the brake 22 in anti-lock braking conditions. In this fashion, a controlled stopping of the vehicle can be maintained—as opposed to continuous application of braking pressure that could cause the vehicle wheels to lock resulting in a loss of vehicle control.

Figure 3:
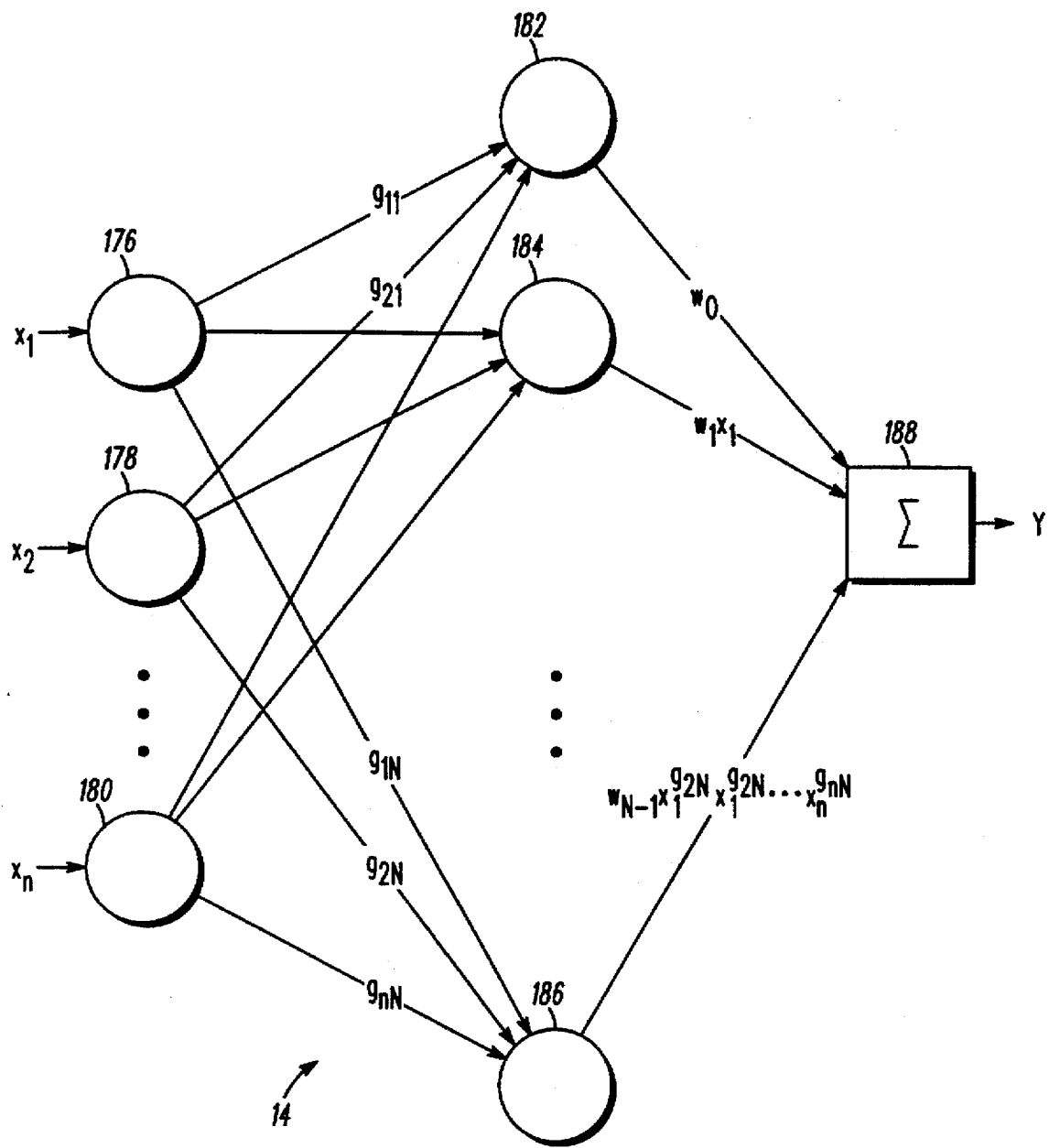
FIG. 3 shows a schematic representation of the polynomial processor used in an embodiment of the present invention.
Figure 4:
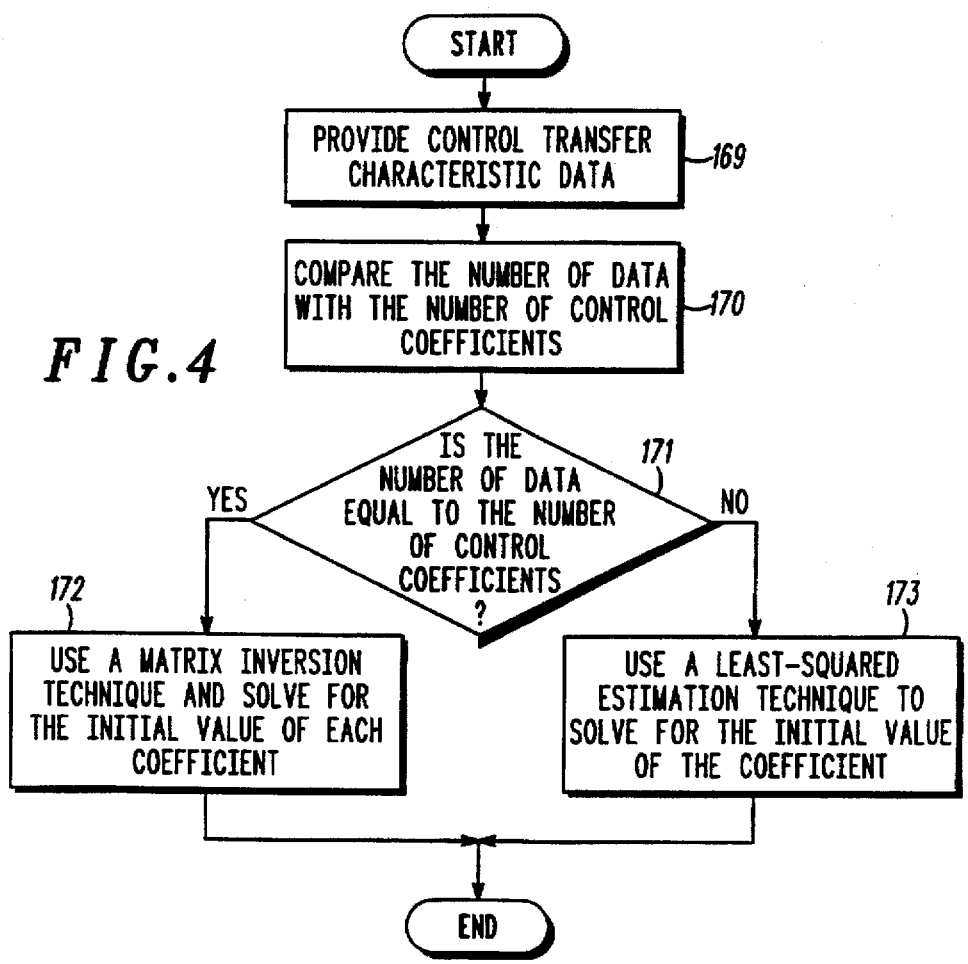
FIG. 4 shows a flow chart representation of a method of determining control coefficients for a processor in accordance with FIG. 3 in one embodiment of the present invention.

The operation of a specific embodiment of the polynomial processor 14 and a method for training this processor is provided in conjunction with FIGS. 3 and 4. In particular, the introduction of the nonlinear terms of the polynomial allow for greater diversity in the determination of a control solution. Further, the great speed that the control signal can be calculated by the parallel network configuration of the polynomial processor that is described herein allow for more rapid control response.

In the preferred embodiment of the present invention, the polynomial processor 54 is a discrete-time system. The plurality of input signals 12 are discrete-time signals that represent a sequence of samples of the corresponding wheel speed at discrete times. The polynomial processor, in turn generates a control signal 16 that is also a discrete-time sequence and the post-processor 18 generates a sequence of brake valve signals 20 that correspond to a cyclic control sequence of desired brake pressures of the brake.

In one embodiment of the present invention, the post-processor 18 includes a comparator for comparing the control signal to a control signal threshold. In this embodiment, the control signal calculates a particular condition to be monitored by the anti-lock braking system in order to determine if anti-lock braking operation is necessary. The quantity being monitored is compared with a threshold and the determination of whether the control signal is above or below the threshold is used to determine if the brake pressure should be either applied or released. In one embodiment of the present invention, the application or release of the brake pressure is generated by one or more pressure application or release pulses effectuated by pulsing the action of one or more brake valves. In further embodiments, a continuous control scheme can be used wherein the amount of the deviation of the control signal from the control threshold is used to determine the magnitude of the pressure application or release.

In a further embodiment of the present invention, the polynomial processor is operative to generate a slip value based on the nonlinear polynomial function of the plurality of input signals, where the slip value indicates an amount of slip between at least one of the plurality of wheels and a driving surface. In this instance, a control signal 16 is determined based on the amount of slip. The brake valve signal is generated by comparing the amount of slip to a slip threshold. If the amount of slip is greater than a slip threshold—that is, the corresponding wheel is rotating significantly slower that what would be deemed ordinary for a given vehicle speed—then the brake pressure is released in order to control the amount of slip. When the amount of slip returns to a value below the slip threshold, the release of brake pressure is discontinued. In this fashion, a cyclic control of the brake pressure, and a corresponding control of a potential lock-up condition, is effectuated.

In the preferred embodiment of the present invention, the slip, $Y(x_1,x_2 \ldots )$, can be calculated as follows:

$$Y = \sum_{i=1}^{m} w_{i-1} x_1^{g_{1i}} x_2^{g_{2i}} \ldots x_n^{g_{ni}} \qquad (1)$$

where $x_i$ represents the speed of the ith wheel, m is the number of terms in the polynomial, $w_{i-1}$ is a control coefficient of the ith term of the polynomial and where $g_{ji}$ is an exponent of $x_j$ in the ith term. Due to the nature of this formulation above, it can be seen that the nonlinear polynomial function for Y can include one or more cross-terms that are proportional to the product of two of the plurality of input signals. Further, the nonlinear polynomial function for Y can include one or more square-terms proportional to the square of one of the plurality of input signals.

Figure 2:
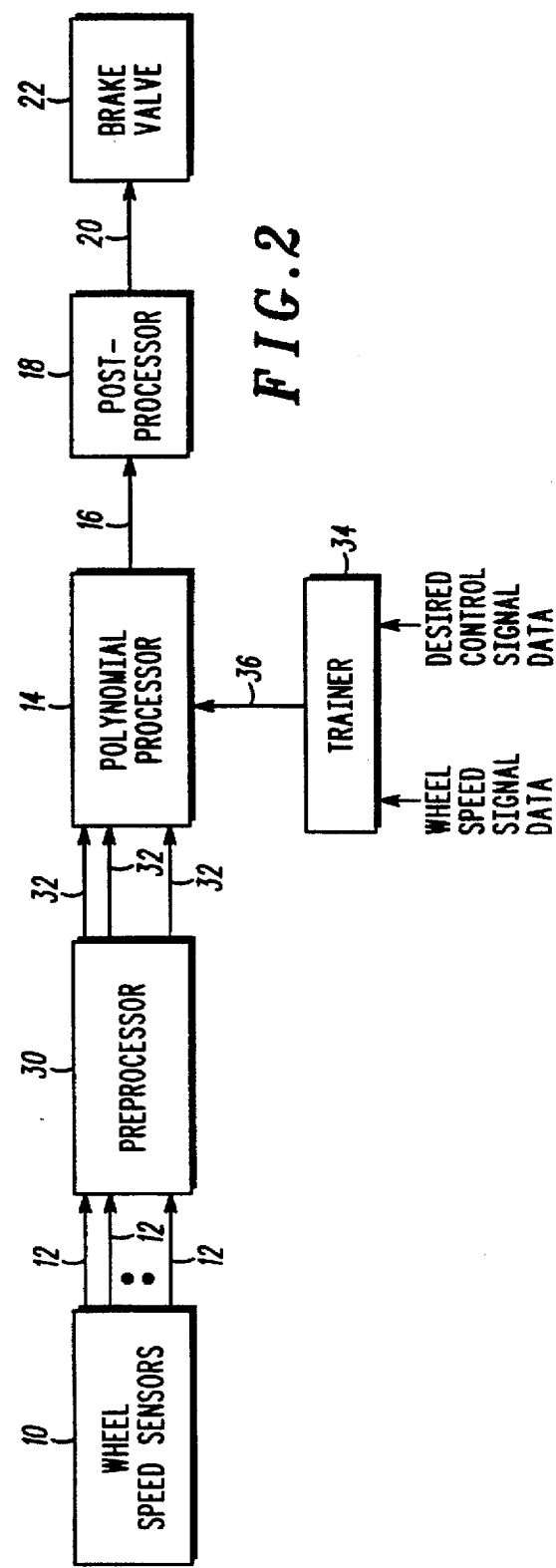
FIG. 2 presents a block diagram of an antilock braking system in accordance with a further embodiment of the present invention.

FIG. 2 presents a block diagram of an antilock braking system in accordance with a further embodiment of the present invention. I this embodiment like reference numerals correspond to like elements of FIG. 1. This embodiment further includes a preprocessor 30, coupled to the plurality of wheel speed sensors 10 and to the polynomial processor 14, for preprocessing the plurality of input signals 12 and transferring the preprocessed plurality of input signals 32 to the polynomial processor. In a preferred embodiment, the preprocessor includes a filter, such as a low-pass filter, for filtering at least one of the plurality of input signals. This filtering can, for instance, reduce the noise present in the input signals.

This system further comprising a trainer 34, coupled to the polynomial processor 14, for determining a plurality of coefficients 36 of the nonlinear polynomial based on a plurality of wheel speed signal data and a plurality of desired control signal data. In a preferred embodiment of the present invention, this training occurs off-line prior to the installation of the system on a vehicle.

FIG. 3 shows a schematic representation of the polynomial processor used in an embodiment of the present invention. This polynomial processor 14 calculates a control signal 16 as a polynomial function of one or more input signals 12. A plurality of input signals, $x_1, x_2, \ldots, x_n$ are fed to input nodes 176, 178, ... 180 of an input layer. The output of each input node 176, 178, ... 180 in the input layer is distributed at least one processing element of a hidden layer (of which only processing elements 182, 184, 186 are shown). Each processing element applies a gating function to each of the control inputs to produce a corresponding gated input. Any given processing element may apply a different gating function to each different control input it receives. For example, processing element 182 applies a gating function ($g_{11}$) to the control input it receives from input node 176; it applies a gating function ($g_{21}$) to the control input it receives from input node 178; and so forth. The gated inputs are multiplied together by a multiplier in the processing element to form a product, which is then multiplied by a control coefficient $w_{i-1}$ to form the ith term of the polynomial. The ith term of the polynomial is added to the other, similarly calculated, terms by summer 188 to produce the control signal Y.

For example, in FIG. 3 processing element 182, which happens to be responsible for generating the first polynomial term, multiplies its gated inputs together to form a product (which happens to be one Because in this case the gating functions $g_{11}, g_{21}, \ldots g_{n1}$ are all 0), which is multiplied by a control coefficient $w_O$ to produce a corresponding output $w_O$. Processing element 184, which happens to be responsible for generating the $w_1 \, x_1$ term of the polynomial, multiplies its gated inputs together to form a product (which happens to be $x_1$ because in this case the gated functions are all 0 except for the gating function that is applied to the $x_1$ output of the input node 176), which is multiplied by a control coefficient $w_1$ to produce a corresponding output $x_1$ $w_1$. In like fashion, processing element 186 produces an output $w_{n-1}$ $x_1$ to the power of $g_{1n}$, $x_2$ to the power of $g_{2n}, \ldots, x_n$ to the power of $g_{nN}$. The outputs of processing elements 182, 184, . . . 186 are summed together by a suitable summing means or function, such as summer 188, in an output layer to produce the control signal Y of the processor as follows:

$$Y = \sum_{i=1}^{m} w_{i-1} x_1^{g_{1i}} x_2^{g_{2i}} \ldots x_n^{g_{ni}} \qquad (2)$$

where m is an integer which represents the number of terms in the polynomial.

FIG. 4 shows a flow chart representation of a method of determining control coefficients for a processor in accordance with FIG. 3 in one embodiment of the present invention. First, regarding box 169, control transfer characteristic data that represent the desired control signal values as a function of the input values (wheel speed signal data) are provided. Next, regarding box 170, the number of data is compared with the number of control coefficients. Regarding decision box 171, if the number of data equal the number of control coefficients, the procedure goes to box 172 which indicates that a matrix inversion technique is used to solve for the initial value of each coefficient. If, on the other hand, the number of data is not equal to the number of control coefficients, the procedure goes to box 173, which indicates that a least squares estimation technique is used to solve for the initial value of each coefficient.

Figure 5:
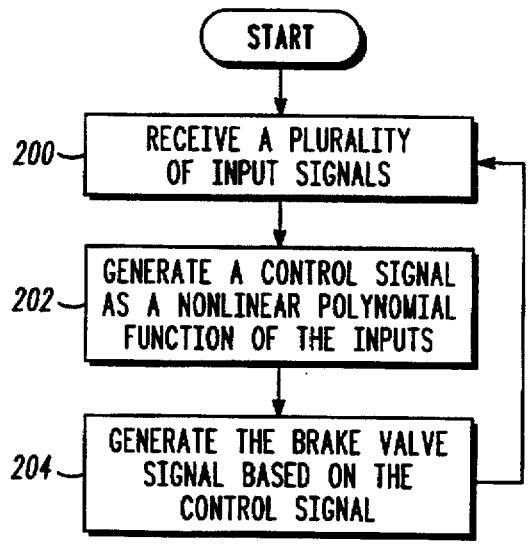
FIG. 5 presents a flowchart of the operation in accordance with one embodiment of the present invention.

FIG. 5 presents a flowchart of the operation in accordance with one embodiment of the present invention. This method of operation can be used in conjunction with the system presented in FIG. 1. A plurality of input signals are received from a plurality of wheel speed sensors as shown in step 200. A control signal is generated based on a nonlinear polynomial function of the plurality of input signals as shown in step 202. The brake valve signal is generated based on the control signal so as to provide cyclic control of the braking pressure in the brake as shown in step 204.

Figure 6:
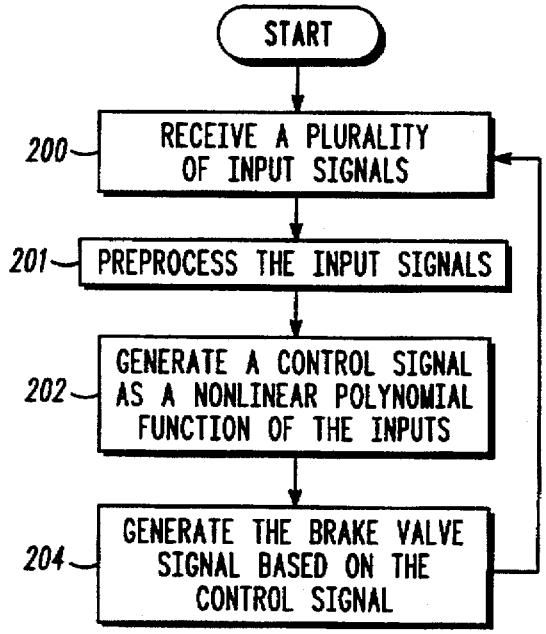
FIG. 6 presents a flowchart of the operation in accordance with an additional embodiment of the present invention.

FIG. 6 presents a flowchart of the operation in accordance with an additional embodiment of the present invention. This method of operation can be used in conjunction with the system presented in FIG. 2. A plurality of input signals are received from a plurality of wheel speed sensors as shown in step 200. The input signal are preprocessed as shown in step 201. A control signal is generated based on a nonlinear polynomial function of the plurality of input signals as shown in step. 202. The brake valve signal is generated based on the control signal so as to provide cyclic control of the braking pressure in the brake as shown in step. 204.

While a preferred embodiment is described herein, one with ordinary skill-in-the-art will recognize that other suitable estimation techniques, for example, extended least squares, pseudo inverse, Kalman filtering techniques, maximum likelihood techniques, Bayesian estimation, polynomial splines, and alike, could likewise be used to fit the nonlinear polynomial to the transfer characteristic data.

In a preferred embodiment of the present invention, the control transfer characteristic data are generated based upon desired operation of the system. Wheel speed signal data are generated, either from actual test runs or via simulation. These input data are combined with desired control data such as desired slip data. The trainer 34 serves to fit a nonlinear polynomial function to the control transfer characteristic data so generated.

The various embodiments of the present invention have been described in terms of the application of braking pressure by a brake valve. This brake valve could be a hydraulic valve that is operative to hydraulically release or apply pressure to the brake. The term "brake valve" used in the present invention should be broadly construed to include any of a wide variety of means for applying or releasing pressure to the brake. In particular, electronic braking systems that provide electronic, rather than hydraulic, control of braking pressure are also included in the present invention. Therefore the term "brake valve" should include such electronic/ electrical means as magnetic calipers for providing braking pressure.

It should be obvious to one of ordinary skill in the art that many of the elements used in the various embodiments of the present invention are well suited for implementation on a processor such as a microprocessor, a digital signal processor or a micro controller. Likewise these elements could be performed in hardware by a custom integrated circuit, ASIC, programmable logic array or similar devices.

While selected embodiments of the present invention have been described in terms of the calculation of a single control signal and a single slip value, these embodiments could likewise include the calculation of a slip value and control-signal that corresponds to each separate wheel and corresponding brake so that individual control would likewise be possible. In this instance, a single polynomial processor can be used to calculate the plurality of slip values. Alternatively, a plurality of polynomial processors could be utilized to perform the same task—based on the speed and performance of the polynomial processors that are used.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In an anti-lock braking system for a vehicle, the vehicle having a plurality of wheels, and a braking system that includes a brake for braking at least one of the plurality of wheels and a brake valve for controlling a braking pressure in the brake in response to a brake valve signal, the method comprising the steps of:

receiving a plurality of input signals from a plurality of wheel speed sensors;

generating a control signal via a polynomial processor having a plurality of processing elements based on a nonlinear polynomial function of the plurality of input signals, the nonlinear polynomial function comprising a first term determined by a first of the plurality of processing elements and a second term determined by a second of the plurality of processing elements; and generating the brake valve signal based on the control signal so as to provide cyclic control of the braking pressure in the brake.

2. The method of claim 1 further comprising the step of preprocessing the plurality of input signals prior to the step of generating a control signal and wherein the polynomial processor has an input layer and a hidden layer.

3. The method of claim 2 wherein the step of preprocessing includes filtering at least one of the plurality of input signals.

4. The method of claim 1 wherein the step of generating the brake valve signal includes comparing the control signal to a control signal threshold polynomial processor has a plurality of processing elements.

5. The method of claim 1 wherein the step of generating a brake valve signal includes generating a sequence of brake valve signals that correspond to a cyclic control sequence of desired brake pressures of the brake.

6. The method of claim 1 further comprising the step of determining a plurality of coefficients of the nonlinear polynomial function based on a plurality of wheel speed signals and a plurality of desired control signals and configuring the polynomial processor based on the plurality of coefficients.

7. The method of claim 6 further comprising the step of comparing a number of data items to a number of the plurality of coefficients.

8. The method of claim 6 wherein the step of determining includes utilizing a matrix-inversion technique.

9. The method of claim 1 wherein the step of generating a control signal includes the substep of:

generating a slip signal based on the nonlinear polynomial function of the plurality of input signals, the slip signal indicating an amount of slip between the at least one of the plurality of wheels and a driving surface.

10. The method of claim 9 wherein the step of generating a brake valve signal includes generating the brake valve signal to command the brake valve to release the brake pressure if the amount of slip is greater than a slip threshold.

11. The method of claim 1 wherein the nonlinear polynomial function includes at least one cross-term proportional to a product of two of the plurality of input signals.

12. The method of claim 1 wherein the nonlinear polynomial function includes at least one square-term proportional to a square of one of the plurality of input signals.

13. The method of claim 1, further comprising the steps of:

providing control transfer characteristic data that represent desired control signal values as a function of the plurality of input signals;

comparing a number of data items with a number of control coefficients;

based on the comparison, performing one of a least squares estimate and a matrix inversion technique.

14. An anti-lock braking system for a vehicle, the vehicle having a plurality of wheels, and a braking system thus includes a brake for braking at least one of the plurality of wheels and a brake valve for controlling a braking pressure in the brake in response to a brake valve signal, the anti-lock braking system comprising:

a plurality of wheel speed sensors for generating a plurality of input signals;

a polynomial processor having a plurality of processing elements, in communication with the plurality of wheel speed sensors, for generating a control signal based on a nonlinear polynomial function of the plurality of input signals, wherein the polynomial function includes a first term determined by a first of the plurality of processing elements and a second term determined by a second of the plurality of processing elements; and a post-processor for generating the brake valve signal based on the control signal so as to provide cyclic control of the braking pressure in the brake.

15. The system of claim 14 further comprising a preprocessor, coupled to the plurality of wheel speed sensors and to the polynomial processor, for preprocessing the plurality of input signals and transferring the preprocessed plurality of input signals to the polynomial processor.

16. The system of claim 15 wherein the preprocessor includes a filter for filtering at least one of the plurality of input signals.

17. The system of claim 16 wherein the post-processor includes a comparator for comparing the control signal to a control signal threshold and wherein the first of the plurality of processing elements is associated with a first coefficient and the second of the plurality of processing elements is associated with a second coefficient, the first and second coefficients determined by a trainer in communication with the polynomial processor.

18. The system of claim 14 wherein the post-processor generates a sequence of brake valve signals that correspond to a cyclic control sequence of desired brake pressures of the brake.

19. The system of claim 14 further comprising a trainer, coupled to the polynomial processor, for determining a plurality of coefficients of the nonlinear polynomial function based on a plurality of wheel speed signals and a plurality of desired control signals, at least one the plurality of coefficients associated with at least one of the plurality of processing elements of the polynomial processor.

20. The system of claim 19 wherein the trainer communicates the plurality of coefficients to the polynomial processor.

21. The system of claim 20 wherein the trainer uses of a matrix-inversion technique.

22. The system of claim 14 wherein the polynomial processor comprises an input layer and a hidden layer.

23. The system of claim 22 wherein the input layer includes a plurality of input nodes.

24. The system of claim 23 wherein the hidden layer includes a first processing element of the plurality of processing elements, the first processing element operable for applying a first gating function to an output of a first of the plurality of input nodes and a second gating function to an output of a second of the plurality of input nodes.

25. The system of claim 14 wherein the nonlinear polynomial function includes at least one square-term proportional to a square of one of the plurality of input signals.

26. The system of claim 14, wherein a plurality of input signals are fed to input nodes of an input layer of the polynomial processor, the output of each input node is distributed to a plurality of processing elements of a hidden layer of the polynomial processor, each of the plurality of processing elements applying a gating function to an output of each input node to produce a corresponding gated input, the corresponding gated input from each of the plurality of processing elements combined to form a product, the product multiplied by a control coefficient to form a first term of the polynomial function.

* * * * *